US010650257B2

(12) United States Patent
Satyakumar et al.

(10) Patent No.: US 10,650,257 B2
(45) Date of Patent: May 12, 2020

(54) METHOD AND DEVICE FOR IDENTIFYING THE SIGNALING STATE OF AT LEAST ONE SIGNALING DEVICE

(71) Applicant: SMR Patents S.à.r.l., Luxembourg (LU)

(72) Inventors: Nikhil Satyakumar, Bangalore (IN); Harish S. Bharadwaj, Bengaluru (IN); Krishna Reddy Konda, Hyderabad (IN); Ganeshan Narayanan, Hosur (IN); Henrik Schäfer, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 13 days.

(21) Appl. No.: 16/001,504

(22) Filed: Jun. 6, 2018

(65) Prior Publication Data

US 2018/0285664 A1    Oct. 4, 2018

Related U.S. Application Data

(63) Continuation-in-part of application No. 15/893,217, filed on Feb. 9, 2018.

(30) Foreign Application Priority Data

Feb. 9, 2017    (DE) ................. 10 2017 102 593

(51) Int. Cl.
*G06K 9/00* (2006.01)
*G06T 7/11* (2017.01)
(Continued)

(52) U.S. Cl.
CPC ....... *G06K 9/00825* (2013.01); *G06K 9/3233* (2013.01); *G06N 3/0454* (2013.01);
(Continued)

(58) Field of Classification Search
CPC ............ G06K 9/00825; G06K 9/3233; G06K 9/4652; G06K 9/00791; G06N 20/10;
(Continued)

(56) References Cited

U.S. PATENT DOCUMENTS 8,831,849 B2    9/2014    Joshi et al.
8,872,579 B2    10/2014    Vladan et al.
(Continued)

FOREIGN PATENT DOCUMENTS

DE    102011105520 A1    12/2011
DE    102010063006 A1    6/2012
(Continued)

OTHER PUBLICATIONS

Salti, Traffic sign detection via interest extraction, pp. 1039-1049 (Year: 2015).*

(Continued)

*Primary Examiner* — Brian Wilson
(74) *Attorney, Agent, or Firm* — Jones Day

(57) ABSTRACT

A method for identifying a signaling state of at least one signaling device including a traffic light includes obtaining at least one image which includes an image of the at least one signaling device, extracting a region of the at least one image which includes the image of the at least one signaling device, detecting the at least one signaling device within the extracted region of the at least one image, and detecting a signaling state of the signaling device after detecting the at least one signaling device within the extracted region.

20 Claims, 11 Drawing Sheets

(51) Int. Cl.
*G06T 7/90* (2017.01)
*G06N 5/04* (2006.01)
*G06K 9/32* (2006.01)
*G06N 3/08* (2006.01)
*G06N 3/04* (2006.01)
*G06N 20/10* (2019.01)
*G06K 9/46* (2006.01)

(52) U.S. Cl.
CPC ............... *G06N 3/08* (2013.01); *G06N 5/046* (2013.01); *G06N 20/10* (2019.01); *G06T 7/11* (2017.01); *G06T 7/90* (2017.01); *G06K 9/4652* (2013.01); *G06T 2207/20084* (2013.01); *G06T 2207/20164* (2013.01); *G06T 2207/30252* (2013.01)

(58) Field of Classification Search
CPC ........ G06N 3/08; G06N 3/0454; G06N 5/046; G06T 7/11; G06T 7/90; G06T 2207/20084; G06T 2207/30252; G06T 2207/20164; B60W 50/16; B60W 2050/146; G06F 3/0481; G06F 3/0488; G06F 3/00791
See application file for complete search history.

(56) References Cited

U.S. PATENT DOCUMENTS

| | | | |
|---|---|---|---|
| 2013/0211682 A1* | 8/2013 | Joshi | G08G 1/0967 701/70 |
| 2017/0031934 A1* | 2/2017 | Snoek | H04L 45/08 |
| 2018/0144203 A1* | 5/2018 | Moosaei | G06K 9/00825 |
| 2019/0050729 A1* | 2/2019 | Lakshmanan | G06N 3/08 |
| 2019/0236414 A1* | 8/2019 | Totolos, Jr. | G06T 7/70 |

FOREIGN PATENT DOCUMENTS

| | | |
|---|---|---|
| DE | 102011087459 A1 | 6/2013 |
| DE | 102012023867 A1 | 6/2014 |
| DE | 112012006761 T5 | 4/2015 |
| DE | 102015003847 A1 | 8/2015 |
| DE | 102015005222 A1 | 12/2015 |
| WO | WO 2009/000580 A1 | 12/2008 |

OTHER PUBLICATIONS

Saini, An Efficient Vision-BasedTraffic Light Detection and State Recognition for Autonomous Vehicles, IEEE, pp. 606-611 (Year: 2017).*

Saini et al., 2017, "An efficient vision-based traffic light detection and state recognition for autonomous vehicles", IEEE Intelligent Vehicles Symposium (IV), Jun. 11-14, 2017, Redondo Beach, CA, USA, pp. 606-611.

* cited by examiner

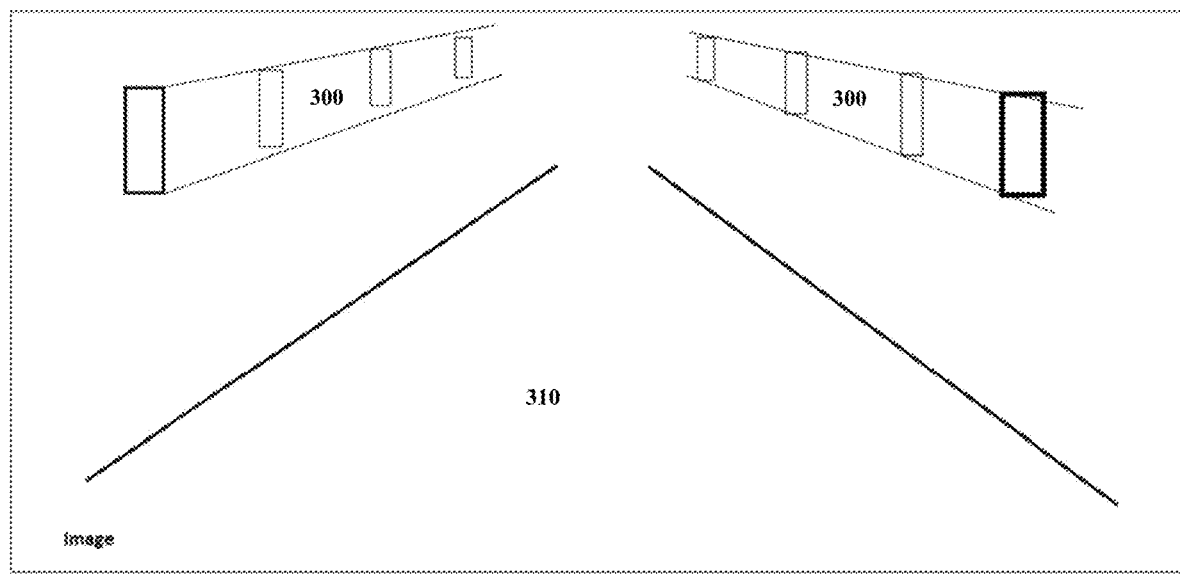
FIG. 9
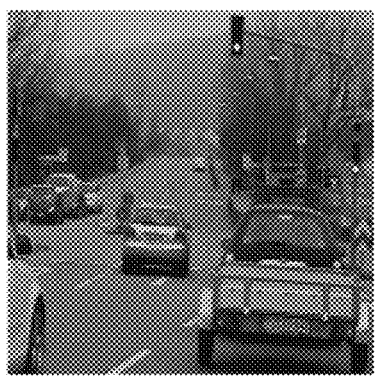 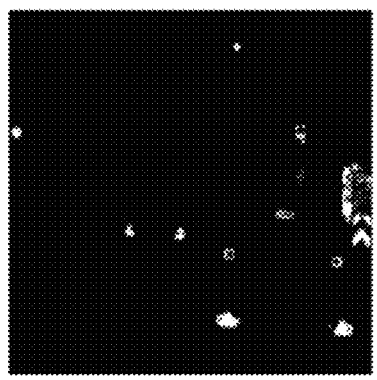 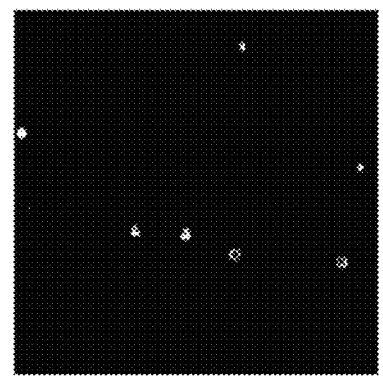
FIG. 10A      FIG. 10B      FIG. 10C

METHOD AND DEVICE FOR IDENTIFYING THE SIGNALING STATE OF AT LEAST ONE SIGNALING DEVICE

CROSS-REFERENCE TO RELATED APPLICATIONS

This application is a continuation-in-part of U.S. patent application Ser. No. 15/893,217, filed Feb. 9, 2018, which claims the benefit of foreign priority to German Patent Application No. DE 10 2017 102 593.6, filed Feb. 9, 2017, each of which is incorporated by reference herein in its entirety for all purposes.

BACKGROUND

1. Field of the Invention

The following description relates to a method for identifying the signaling state of at least one signaling device. For example, the signaling devices may include traffic lights, and a plurality of such signaling devices may be present. The following description also relates to a motor vehicle in which the method is carried out.

2. Related Art

A number of systems are known and described in the field of driver assistance and the autonomous driving of motor vehicles. For example, autonomous driving systems are described in German Patent Application Nos. DE 10 2010 063 006 A1, DE 10 2011 105 520 A1, and DE 10 2012 023 867 A1, in which traffic lights are detected and the signaling state thereof is identified and evaluated with the aid of a front camera in a vehicle. In the process, the environment outside the traffic lights can be considered in order to control the vehicle in a suitable manner. Cameras are also used in motor vehicles in order to define a state of the environment, as described in US Patent Application Publication Nos. 2013/0211682 A1 and 2014/0222280 A1, and described in International Patent Application Publication No. WO 2009/000580 A1.

DE 10 2011 087 459 A1 describes a driver assistance system having a detecting means, such as a camera, for detecting an environment of the vehicle as well as a user interface which can be used by the driver. The driver can specify objects by means of this user interface. These objects can be, for example, traffic lights, road signs, lane markings, other vehicles or a parking space. One or more functions are executed for this object as a function of the type of object specified.

DE 11 2012 006 761 T5 describes a driver assistance device which does not output any unnecessary alerts for the driver. The driver assistance device includes a display which displays an image of the environment of a vehicle, a setting unit which sets a target selected by the driver as a target for recognition, a detection unit which detects a change in state of the target for recognition in the image, and an alert control unit which alerts the driver of the detection result. The fact that no alerts are output if a target for recognition has not been selected by the driver means that no unnecessary alerts are output.

DE 10 2015 005 222 A1 describes a method for establishing traffic lights which are of relevance to a vehicle. In this case, an image of the environment is detected by means of a camera, which image includes the traffic lights and which is displayed on a display. A set of traffic lights which is relevant to the vehicle is established as a function of the detected viewing direction of the driver of the image displayed on the screen.

DE 10 2015 003 847 A1 describes a method for detecting light signals of traffic lights, and for signaling these light signals to the driver of a vehicle. In this case, the environment is detected by means of a camera and the detected image data are evaluated for the presence of red light signals. Red traffic light signals are displayed on a display and the driver can confirm by means of a control action whether a displayed red-light signal originates from a relevant set of traffic lights or which displayed red light signal originates from a relevant set of traffic light.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a method for identifying a signaling state of at least one signaling device including a traffic light includes obtaining at least one image which includes an image of the at least one signaling device, extracting a region of the at least one image which includes the image of the at least one signaling device, detecting the at least one signaling device within the extracted region of the at least one image, and detecting a signaling state of the signaling device after detecting the at least one signaling device within the extracted region.

The method may further include generating a saliency map prior to extracting the region of the at least one image which includes the image of the at least one signaling device, and limiting an area of region extraction based on the generated saliency map.

The obtaining of the at least one image may be performed using an image input device.

The extracting of the region may be performed using at least one of color segmentation, a filtering operation, and a Maximally Stable Extremal Regions (MSER) operation.

The color segmentation may be performed using the Hue, Saturation, Value (HSV) color space.

The filtering operation may include at least one of filtering by determining a width/height aspect ratio, an area, a texture, a size, and a shape of a detected candidate region.

The filtering operation may include determining the width/height aspect ratio of a blob of the detected candidate region and filtering out the blob where the width/height aspect ratio is substantially greater than or substantially less than one.

The MSER operation may include localizing a structure of the traffic light and adjusting a bounding box size.

The MSER operation may include selecting two seed points, one of the two seed points being selected based on an output of the color segmentation so that if the output is red, the bounding box is fixed so that a traffic light blob occupies an upper region of the bounding box, if the output is green, the bounding box is fixed so that the traffic light blob occupies a lower region of the bounding box, and if the output is amber or yellow, the bounding box is fixed so that the traffic light blob occupies a middle region of the bounding box.

The detecting of the at least one signaling device within the extracted region may include extracting histograms of oriented gradients (HOG) features and generating an HOG feature vector.

The detecting of the at least one signaling device within the extracted region may further include feeding the HOG feature vector to a non-linear Support Vector Machine (SVM). In a preferred example, a non-linear SVM is used rather than a linear SVM for improved accuracy.

The detecting of the signaling state may be performed using a Convolutional Neural Network (CNN).

The CNN may include an input layer, a first convolution layer, a first pooling layer, a second convolution layer, and a second pooling layer.

The CNN may further include two consecutive fully connected layers mapping to three neurons which correspond to three traffic lights states.

The CNN may further include an output inner product layer, a rectified linear function neuron layer, and an output layer mapping to four neurons which correspond to three traffic light states and an ambiguous state.

BRIEF DESCRIPTION OF THE FIGURES

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIG. 9 is a diagram illustrating a saliency map according to the example of FIG. 8.

FIGS. 10A, 10B, and 10C are diagrams illustrating a color segmentation and filtering process according to the examples of FIG. 7 or 8.

DETAILED DESCRIPTION

Figure 1A:
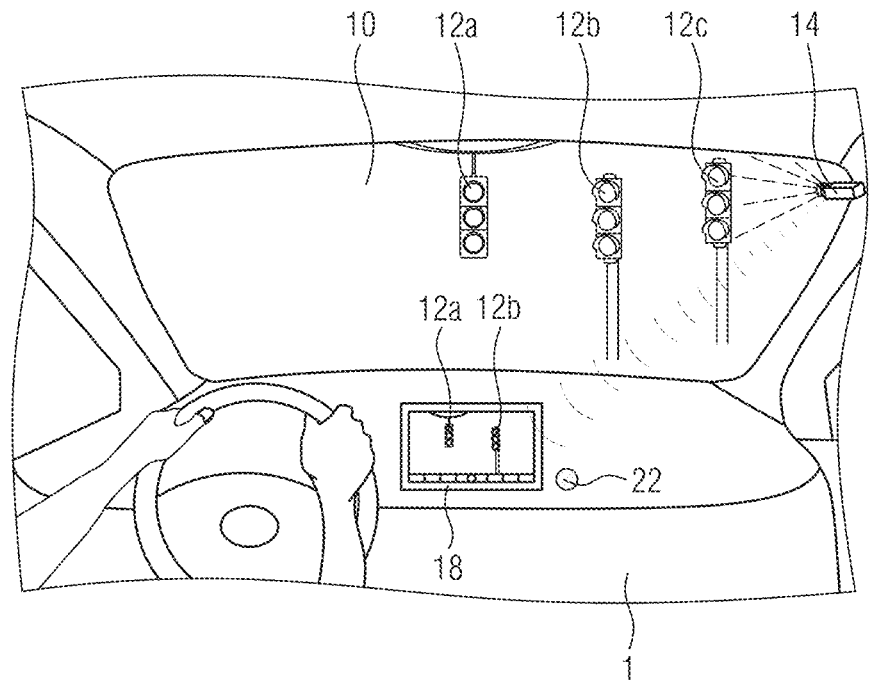
FIG. 1A is a diagram illustrating a plurality of traffic lights from the perspective of a motor vehicle operator and a representation regarding this on a touchscreen.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Figure 1B:
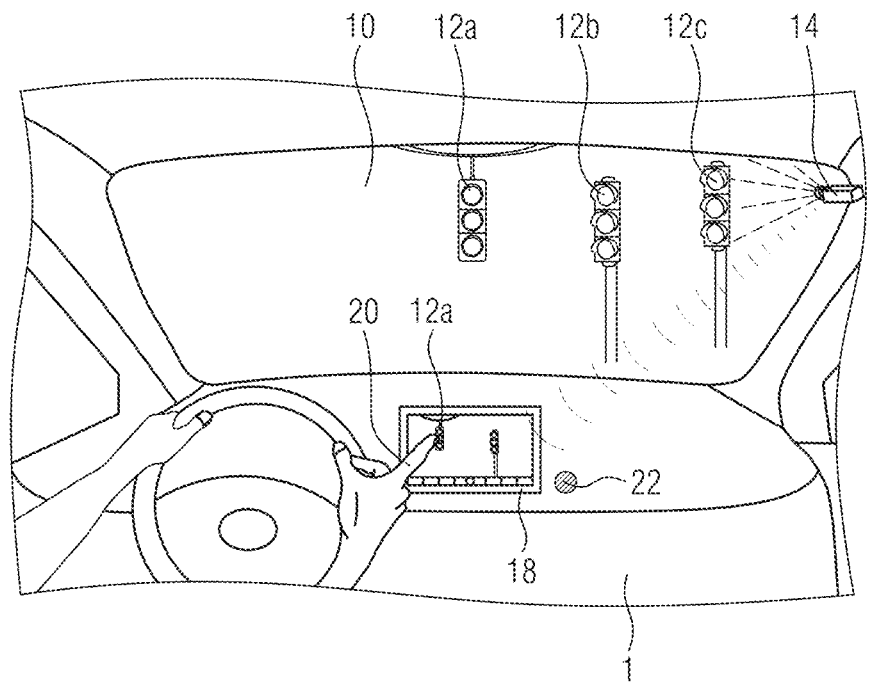
FIG. 1B is a diagram illustrating the user input of a driver related to the representation on the touchscreen according to FIG. 1A.

In a motor vehicle which is shown in FIG. 1A and referred to in its entirety as 1, a plurality of traffic lights 12a, 12b, 12c can be identified. There may be arranged an image input device such as a camera 14 (i.e. an optical sensor having, if applicable, a lens in front of it), with the aid of which images of all of the traffic lights 12a, 12b, 12c can be recorded. With the aid of a selection method in which, for instance as in the prior art cited above, it can be considered in which lane the car is located, or where a stop line is arranged, the traffic lights 12a and 12b can be selected from the traffic lights 12a, 12b, 12c, and the traffic light 12c can be rejected for being, in all probability, irrelevant for the driver. The two sets of traffic lights 12*a* and 12*b* possibly show different signaling states. Both are displayed on a touchscreen 18, so that the driver can select a set of traffic lights 12*a* with his hand 20 according to FIG. 1B. Subsequently, images of the selected traffic lights 12*a* continue to be recorded with the aid of the camera 14, and a change in the signaling state is detected. If, for example, the traffic lights change to amber and subsequently turn green, an acoustic signal is output via a microphone 22. In the case of a self-propelled car, an autonomous start can be initiated or take place. It should be appreciated that a location of the camera 14 may be anywhere. This includes inside the vehicle, outside the vehicle such as part of a surround view system, or not part of the vehicle at all such as part of an independent camera system on a smart device or otherwise.

Figure 2A:
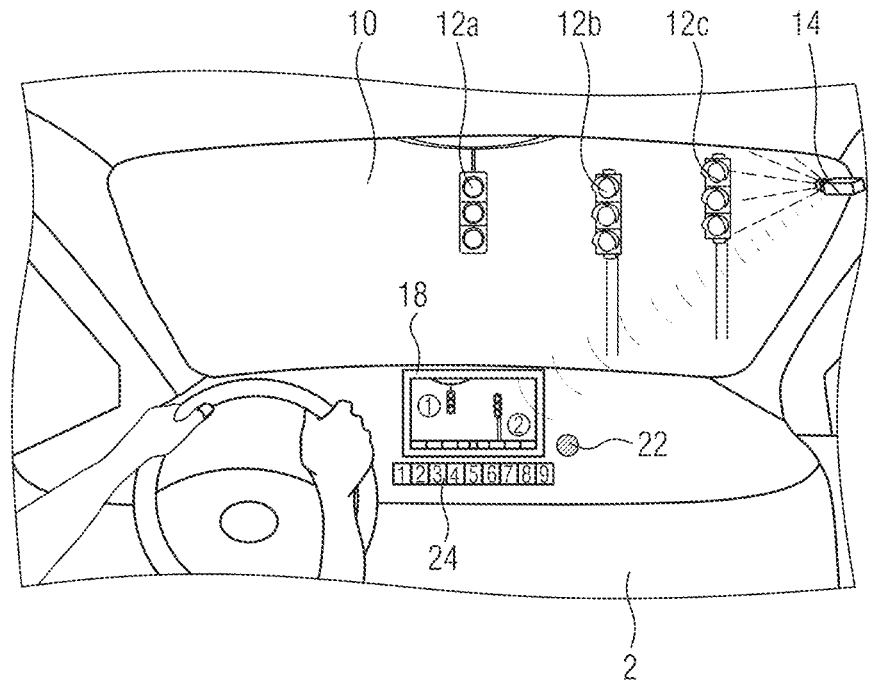
FIG. 2A is a diagram illustrating an alternative of the representation on the touchscreen according to FIG. 1A.
Figure 2B:
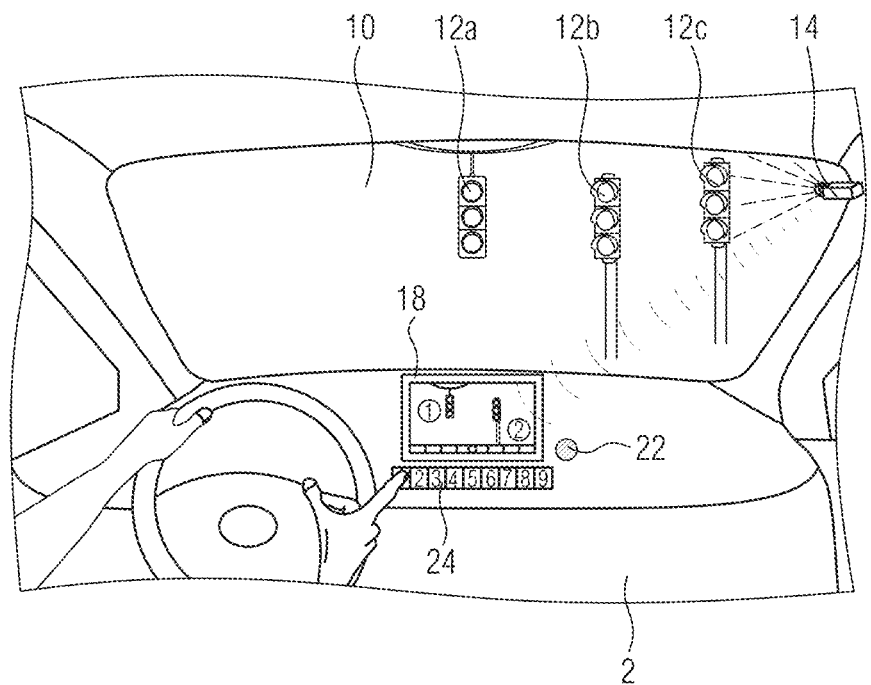
FIG. 2B is a diagram illustrating the user input related to the representation on the touchscreen according to FIG. 2A.

In the case of the alternative according to FIG. 2A, a number "1" or respectively "2" is displayed in a motor vehicle 2 in each case regarding the representation of the images of the traffic lights 12*a* and 12*c* recorded by means of the camera 14, and the driver can select, via a numerical keypad 24 (in general: an alphanumerical keyboard or other input devices for alphanumerical characters), the "1", see FIG. 2B, and a corresponding signal can subsequently be output via the microphone 22.

Figure 3:
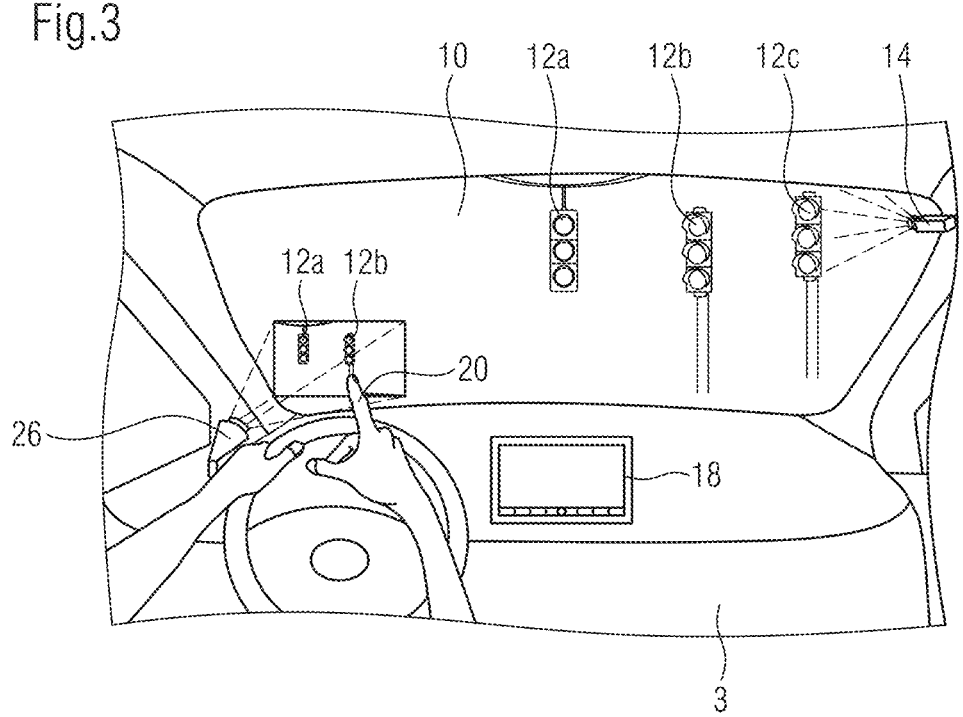
FIG. 3 is a diagram illustrating another alternative of the representation of traffic lights in a motor vehicle by a projection.

Instead of a touchscreen, as shown in FIG. 3, an image can also be cast onto the inside of the windshield 10 in a motor vehicle 3 by means of a projector 26, and the driver 20 can execute a gesture with the aid of his hand 20, for example point his finger in the direction of a set of traffic lights in the beam path, wherein the input is detected by a suitable optical sensor in the projector 26 or another detecting device such as, for instance, an additional camera (not shown).

Figure 4:
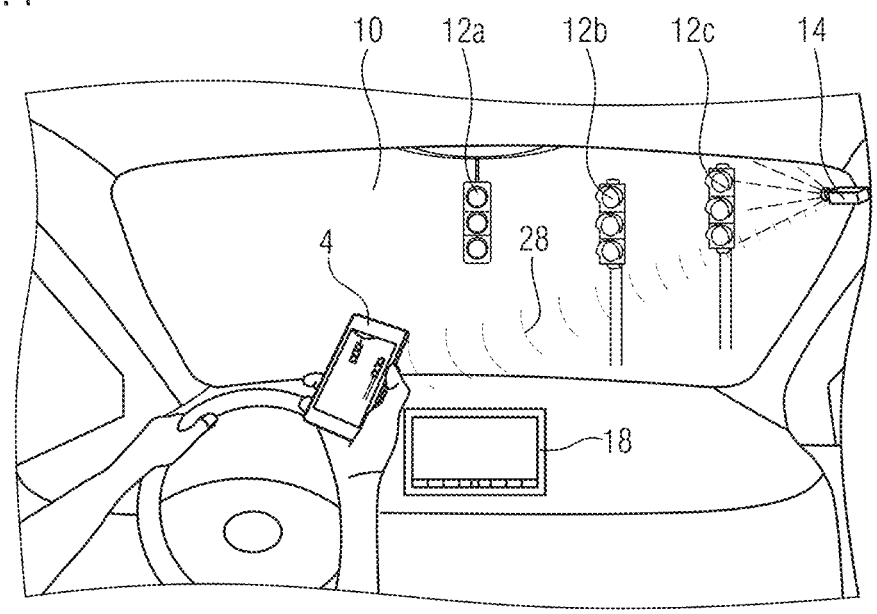
FIG. 4 is a diagram illustrating an alternative to the representation of traffic lights in a motor vehicle, using a smartphone.

In another example, it is also possible for the image to be represented on a smartphone which is shown in FIG. 4 and designated therein by 4. The camera 14 transmits, for example, by radio (as indicated by the radio connection 28), the images of the traffic lights 12*a* and 12*b* to the smartphone 4. The user can then make an appropriate selection on the smartphone 4, because the surface of the smartphone acts like the touchscreen from FIG. 1A.

Figure 5:
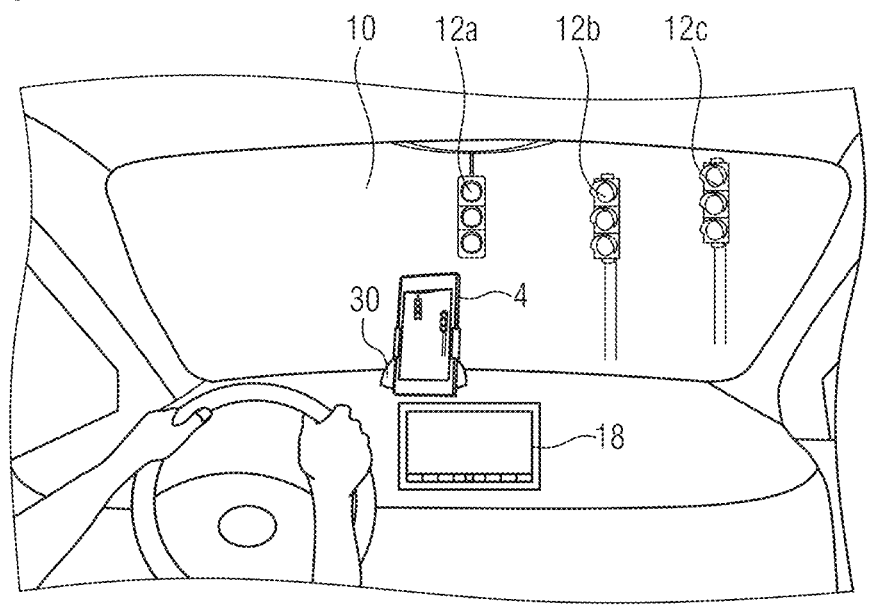
FIG. 5 is a diagram illustrating a variant of the alternative according to FIG. 4.

According to FIG. 5, the smartphone 4 can be secured in a bracket 30, wherein the camera of the smartphone 4 itself can be used, in order to record images of the traffic lights 12*a*, 12*b* and 12*c* and to select the traffic lights 12*a* and 12*b* according to an algorithm.

Figure 6:
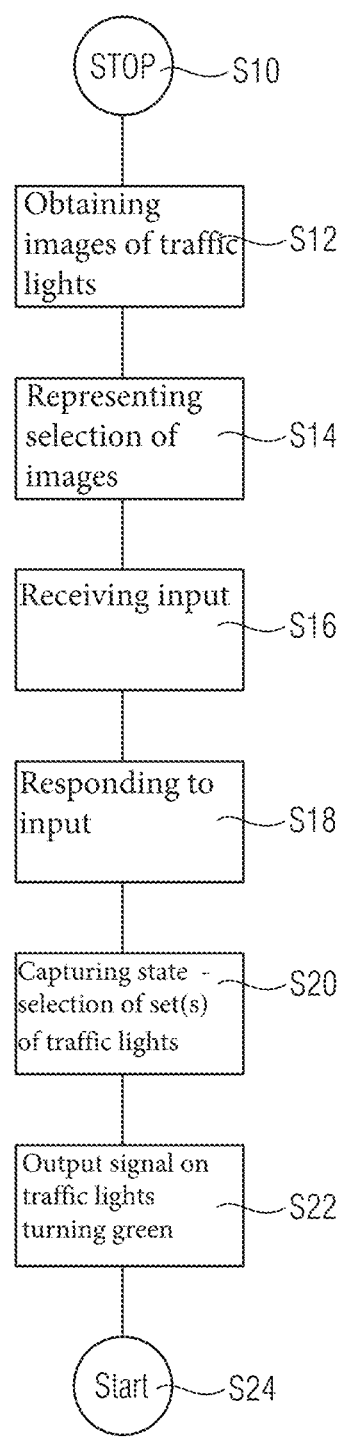
FIG. 6 is a diagram illustrating a flow diagram in order to illustrate the steps of the method according to the invention.

The method explained again below in full is described in reference to FIG. 6.

In an example, the method commences with the stopping of a motor vehicle ("STOP") as step S10, after which the images of the traffic lights 12*a*, 12*b*, 12*c* are obtained in step S12 with the aid of the respective camera 14 (FIGS. 1A, 1B, 3 and 4) or with the aid of the camera of the smartphone 4 (in FIG. 5). In step S14, the selection of the images is then shown (on the touchscreen 18 according to FIG. 1A and FIG. 2A, on the windshield 10 according to FIG. 3, on the smartphone 4 according to FIG. 4 or FIG. 5). In step S16 the input is then received (see FIG. 1B on the touchscreen 18, FIG. 2B on the keyboard 24, FIG. 3 by means of the finger 20 in the beam path, FIG. 4 on the smartphone 4 and, in the case of FIG. 5, on the smartphone 4). The input is evaluated according to step S18: Since only a single set of traffic lights 12*a* has been selected in all of the examples provided here, it is detected in step S18 that the set of traffic lights 12*a* is to be subsequently observed. The signaling state of this selected set of traffic lights 12*a* is detected in step S20 and, in step S22, when the traffic lights turn green, an output signal is given, for example via the loudspeaker 22. The motor vehicle is then started by the driver himself or by an autonomous driving system after the stop in step S24. In another example, the selection of one of the traffic lights 12*a*, 12*b*, 12*c* may be done automatically using the output from a lane keep assist or lane change assist algorithm as an input to the traffic light recognition system. In other words, a user would not need to manually select the traffic light 12*a* as described in the example method above because a traffic light 12*a*, 12*b*, 12*c* would be automatically selected using the output of a lane keep assist or lane change assist algorithm.

Figure 7:
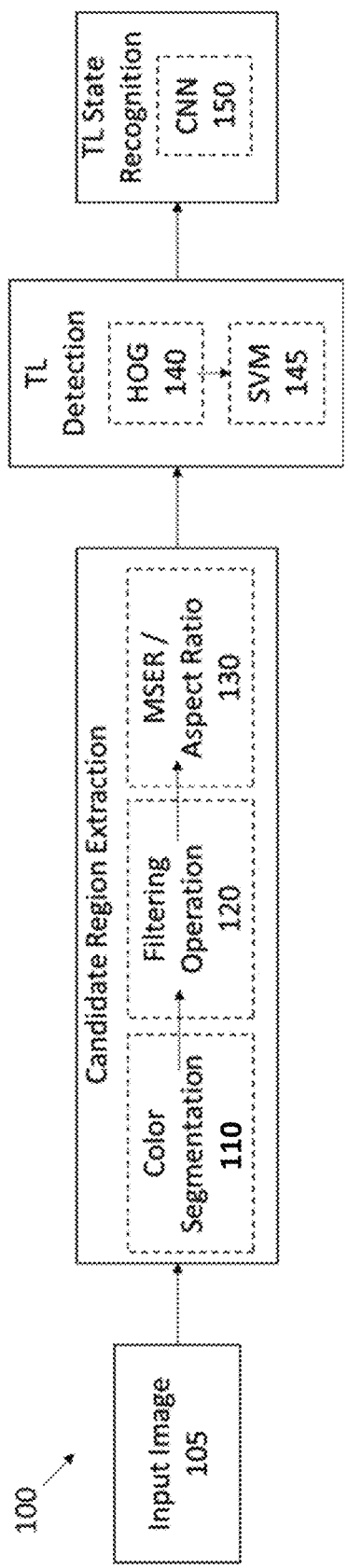
FIG. 7 is a diagram illustrating an overview of a first example of a system for vision-based traffic light detection and state recognition.
Figure 8:
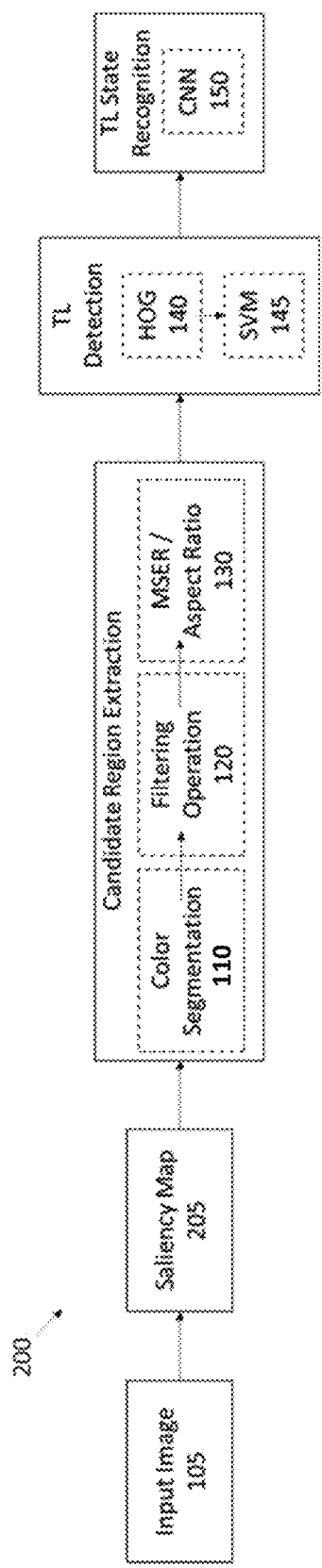
FIG. 8 is a diagram illustrating a second example of a system for vision-based traffic light detection and state recognition.

FIGS. 7 and 8 are diagrams illustrating an overview of a first and second example of a system for vision-based traffic light detection and state recognition.

Referring to FIG. 7, the first example of a system 100 for traffic light detection may include a step 105 for receiving an input image which may be generated by and received from an image capturing device. In the first processing step 110, signaling device candidate regions are generated by performing HSV based color segmentation, which are then filtered out in a filtering step 120 using shape and area analysis filtering operations. Further, in order to incorporate the structural information of the signaling devices in diverse background scenarios, a Maximally Stable Extremal Region (hereinafter "MSER") and aspect ratio step 130 is employed, which helps to localize the correct signaling device in the image. To further validate the signaling device candidate regions, Histogram of Oriented Gradients (hereinafter "HOG") features are extracted for each region in step 140 and signaling device structures are validated using Support Vector Machine (hereinafter "SVM") in step 145. The state of the signaling devices are then recognized using a Convolutional Neural Network (hereinafter "CNN") in step 150.

FIG. 8 is a diagram illustrating a second example of a system for vision-based traffic light detection and state recognition.

Referring to FIG. 8, similar to the system 100, the second example of a system 200 for traffic light detection may also include a step 105 for receiving an input image which may be generated by and received from an image capturing device. In a first processing step 205, the input image salient regions are extracted which correspond to regions where there is a maximum likelihood of occurrence of signaling device structures. The remaining steps for the system 200 may be the same as the system 100 and employed in the same order; however, the processes and algorithms used to employ each of the steps such as the color segmentation step 110, the MSER step 130, and the CNN step 150, and others may be performed or applied differently.

FIG. 9 is a diagram illustrating a step 205 of using a saliency map according to the example of FIG. 8. This step 205 may be used, as illustrated in the example system 200, but does not have to be used, as illustrated in the example system 100.

The location of a signaling device in an image frame may be dependent on a type of camera used, external parameters of the camera and distance of traffic light from a vehicle, along with the standardized height of signaling device poles which are specific to a country. Hence the location of signaling devices can be predicted to occur in certain regions given such parameters. This is illustrated in FIG. 9, where, as a vehicle approaches the signaling device on the road 310, the size of the structure increases in terms of pixels. An appearance of a signaling device in a video frame is principally a function of its location with respect to the vehicle, as represented by epipolar lines joining the various occurrences of signaling devices in a video frame. These continuous regions of occurrences of signaling devices are used as regions of interest (ROI) 300. In order to detect signaling devices in a video frame, instead of processing the whole video frame, only the ROI 300 are processed in this example. This substantially reduces the complexity of the used algorithm.

The complexity has been found to be reduced by at least about 70 percent. While saliency map generation based on GPS and traffic light location databases have been suggested, the saliency map of this example is generated via machine learning and country specific signaling device specifications. The regions of occurrence of signaling devices in a video frame may be a function of location of the signaling devices in a world coordinate system along with external and internal parameters of the camera. Hence, the region may be modeled as a mathematical function of calibration parameters of the camera using machine learning techniques. The process of prediction of ROI 300 may be learnt by training the machine learning algorithm on signaling device occurrences on video data which are representative of geographical locations in which the signaling device detection application or the system 200 is to be deployed.

FIGS. 10A, 10B, and 10C are diagrams illustrating a color segmentation and filtering process according to the examples of FIG. 7 or 8.

Signaling systems in most countries are standardized to have a specific type of signaling device structure and color. Signal lights are often characterized by specific colors: Red, Amber and Green. Color is a major characteristic in signaling devices, thus a color segmentation step 110 is used in system 100 and system 200 for limiting the number of potential signaling device candidate regions. In the RGB color space, the luminance and chrominance components are not decoupled, hence it is not illumination invariant. Signaling devices are exposed to varied lighting conditions, therefore it may be desirable to make the system invariant to illumination. Hence the Hue, Saturation, Value (hereinafter "HSV") color space may be used, which separates luminance and chrominance components. In this example, hue and saturation are the two features which are of more interest in the HSV color space, thereby also reducing the feature space from 3D in the RGB color space to 2D in the HSV space.

The color segmentation step 110 results in detection of objects which have chrominance similar to that of traffic light, thereby yielding false positives (non-signaling device attributes). The majority of false positives may be eliminated by applying signaling device specific filtering operations 120 (i.e. aspect ratio, area of the detected candidates, texture and size of the detected blob). Generally, shape information can also be used after color segmentation for detection of signaling devices.

A signaling device or traffic light illuminated component is generally of a circular shape and has an aspect ratio (width/height) of one. However, due to occlusions and other associated noise, this ratio may slightly vary. In an example, such as with either system 100 or system 200, only the traffic light blobs with aspect ratio similar to that of a circle may be considered and all other blobs may be classified as non-traffic lights.

At the end of this step 120, a substantial amount of false positives may be eliminated, however a number of false positives may still remain and they may be removed using shape based features as described in more detail below. Still referring to FIGS. 10A, 10B, and 10C, FIG. 10A illustrates the input image, FIG. 10B illustrates the outcome after color segmentation, and FIG. 10C illustrates the outcome after the filtering process.

FIGS. 11A to 11H are diagrams illustrating a localization and/or Maximally Stable Extremal Regions (MSER) process according to the examples of FIG. 7 or 8.

The contour detected using color segmentation contains signaling devices or traffic lights and other similar colored objects. The size of a traffic light is relatively small and a number of features resulting from the traffic light are relatively insufficient to represent a complex structure of the traffic light. Therefore, the entire traffic light structure must be extracted for more relevant features, which results in more efficient detection and recognition phases. Extraction of a traffic light structure may initially be done by fitting a bounding box over the traffic light. The size of the bounding box may be fixed based on the maximum size of the traffic light structure that can be encountered by the system. The maximum size of the bounding box may be determined from ground-truth.

Because the area covered by a fixed size bounding box when the signal is far from the camera and when the signal is close to the camera may vary drastically, a localization method may be used. In the absence of a localization method for traffic light structure, the bounding box for a signal which is far from the camera will contain traffic signal along with diverse backgrounds which are non-traffic regions. This makes it difficult to effectively detect and recognize the state of a traffic signal.

Figure 11A:
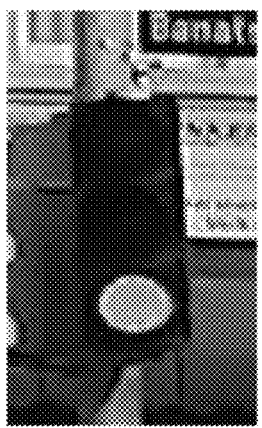
FIGS. 11A, 11B, 11C, 11D, 11E, 11F, 11G, 11H are diagrams illustrating a localization and/or Maximally Stable Extremal Regions (MSER) process according to the examples of FIG. 7 or 8.
Figure 11B:
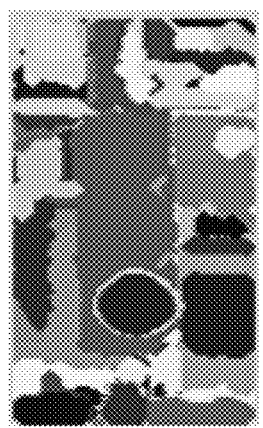
Figure 11C:
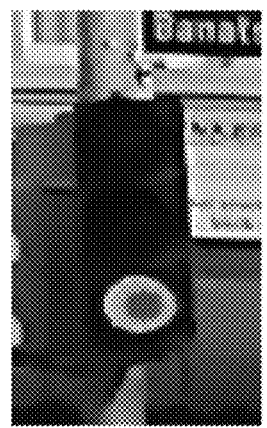
Figure 11D:
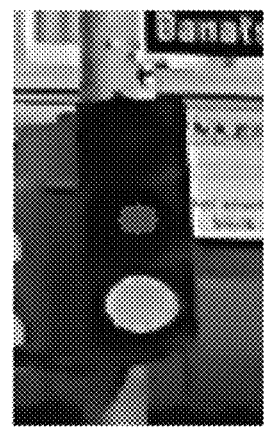
Figure 11E:
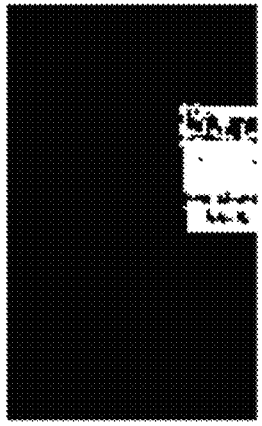
Figure 11F:
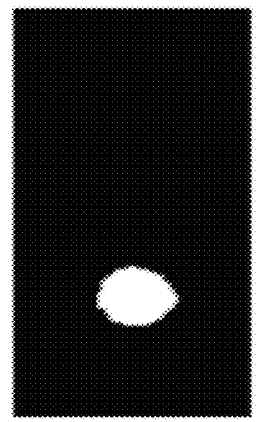
Figure 11G:
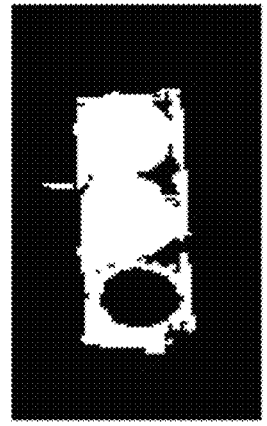

To localize the correct structure of a traffic light in diverse background and to make the size of the bounding box adaptable based on the distance of camera from the signal, a Maximally Stable Extremal Regions (MSER) technique 130 may be used. FIG. 11B shows the result of MSER clustering. In MSER, each frame is binarised at a number of different threshold levels. The regions which remain stable over large range of thresholds are the regions of interest. Traffic light structures undergo a lot of affine transformation with respect to camera and the size of traffic lights may vary considerably with respect to the viewpoint. MSER regions are invariant to affine transformation as well as they support multi-scale detection (capable of detecting both fine and large structures). Both these properties of MSER are important characteristics for traffic light structure localization. MSER results in various clusters in the image as shown in FIGS. 11E to 11G.

Figure 11H:

In an example for selecting the most relevant clusters, two seed points may be selected. One seed point may correspond to the center of the signal, as detected using color segmentation and another seed point may correspond to any point of the signal structure. FIG. 11A shows the input image and FIGS. 11C and 11D indicate seed points 1 and 2, respectively. The clusters that do not correspond to the seed points are eliminated (for example, the cluster in FIG. 11E). The next step may be to shortlist the clusters which best represent a traffic signal. Clusters which correspond to seed point 1 (FIG. 11F) and seed point 2 (FIG. 11G) may be selected, and then the two selected clusters may be integrated and the resultant output being a contour corresponding to the localized traffic signal structure as shown in FIG. 11H. The outcome of this stage is processed in next stage for detection and recognition of the traffic light.

Figure 12:
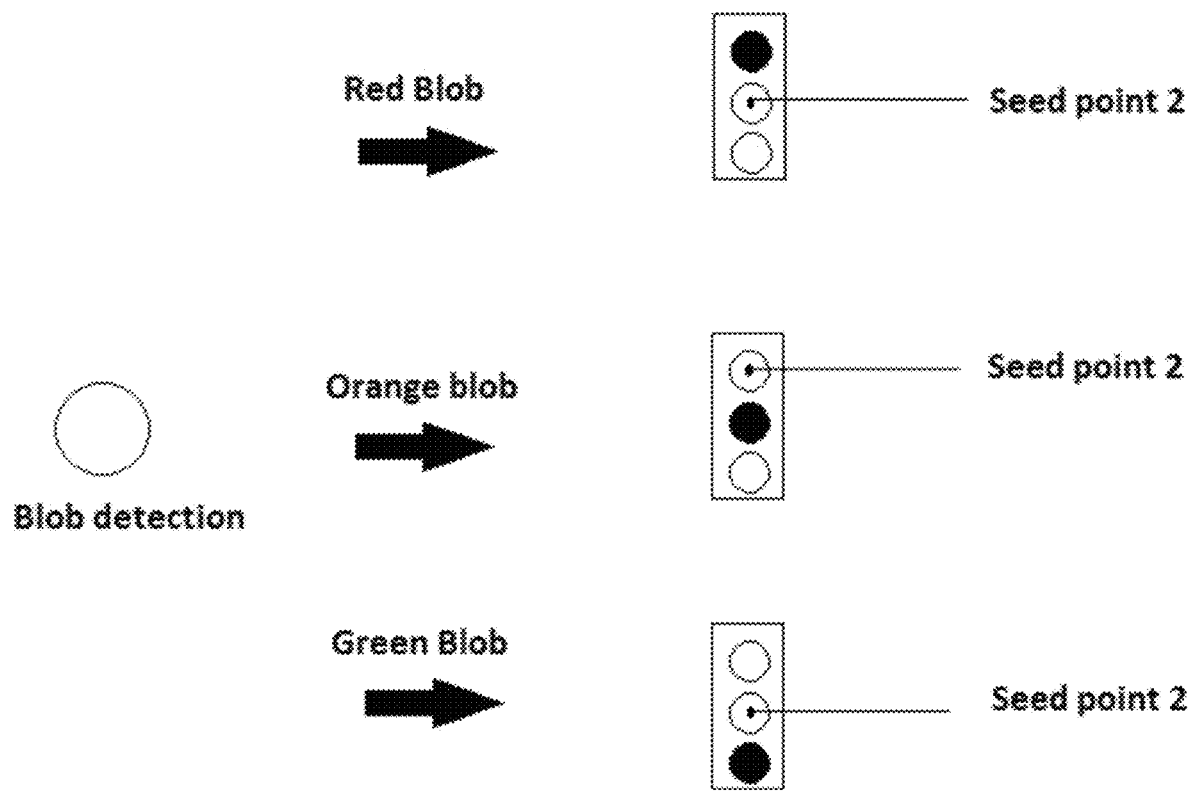
FIG. 12 is a diagram illustrating a selection of seed points for Maximally Stable Extremal Regions (MSER) process according to the example of FIG. 8.

In another example for selecting the most relevant clusters as part of the MSER technique 130, two seed points may be selected. One seed point may correspond to the center of the signal, as detected using color segmentation and another seed point may corresponding to any point of the signal structure. A process for the selection of seed points corresponding to structure may be as follows: Based on color segmentation, output location of a traffic light blob within the structure is estimated and a fixed size bounding box is fitted accordingly. For example, if the color segmentation output is red, a bounding box is fixed in such a way that the blob occupies the upper portion of bounding box. Similarly, if the traffic light blob is green, a bounding box is so fixed that the traffic light blob occupies the lower portion. In case of an amber or yellow blob, the blob is fixed to occupy the middle region of the bounding box. This process is illustrated in FIG. 12. The size of the bounding box may be estimated via statistical analysis of ground truth data used for training. After the bounding box has been fixed, any black pixel which falls within the bounding box may be taken as a seed point corresponding to traffic light structure.

Figure 13:
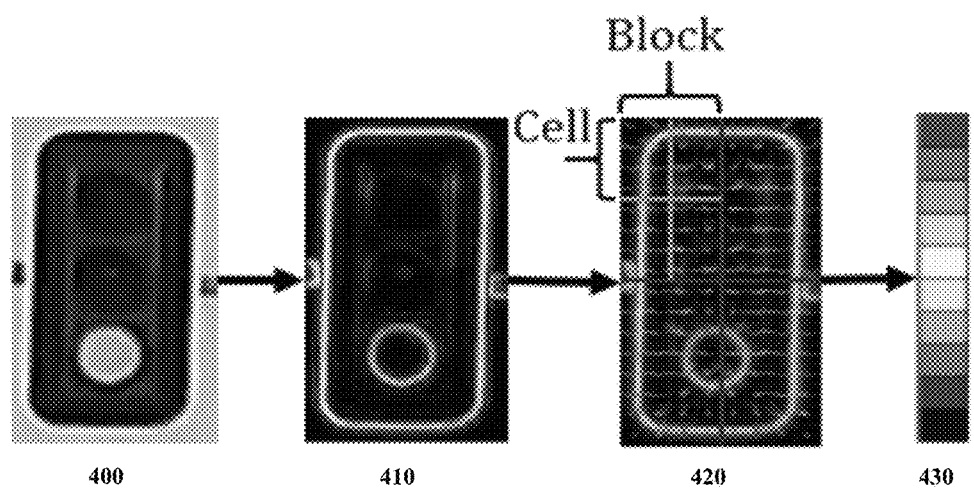
FIG. 13 is a diagram illustrating a Histogram of Oriented Gradients (HOG) process according to the example of FIG. 7 or 8.

FIG. 13 is a diagram illustrating a Histogram of Oriented Gradients (HOG) process 140 according to the example of FIG. 7 or 8.

For each of the candidate regions resulting from the previous step, Histograms of Oriented Gradients (HOG) features may be extracted to aid in the detection of the traffic light structures, thereby eliminating most of the false positives. HOG features are relatively invariant to scale and rotation which is important for traffic lights. HOG features may be computed by taking orientation histograms of edge intensity in a local region. As indicated previously, color is a major characteristic of a traffic signal. The performance of the conventional HOG may be improved by combining HOG features over multiple color channels. A simple visualization of HOG feature extraction is illustrated in FIG. 13. In an example, for extracting the HOG features, the detection window size may be fixed at (width×height=90×180) empirically. FIG. 13 illustrates the detection window 400, the gradient map 410, the HOG feature extraction 420, and the final HOG feature vector 430.

HOG feature descriptors may then be fed to a non-linear SVM classifier for detecting traffic light structures. Nonlinear SVMs will create a space transformation, it will be a linear SVM in the feature space, but a non-linear separation border in the input space. The lower the number of input features, the easier it is for the non-linear SVM to perform space transformation. Due to a large amount of training data and a relatively small number of HOG features, a nonlinear SVM classifier is preferred. SVM is a supervised learning model, it constructs a hyper-plane in a high dimensional space to separate the feature points into two or more classes. The feature points from which the separated hyperplane is located at the maximum margin are known as support vectors. For a test data including a potential candidate regions, the HOG features may be extracted and classified by calculating the distance between the extracted feature points of the test image with the support vectors found during the training phase.

Figure 14:
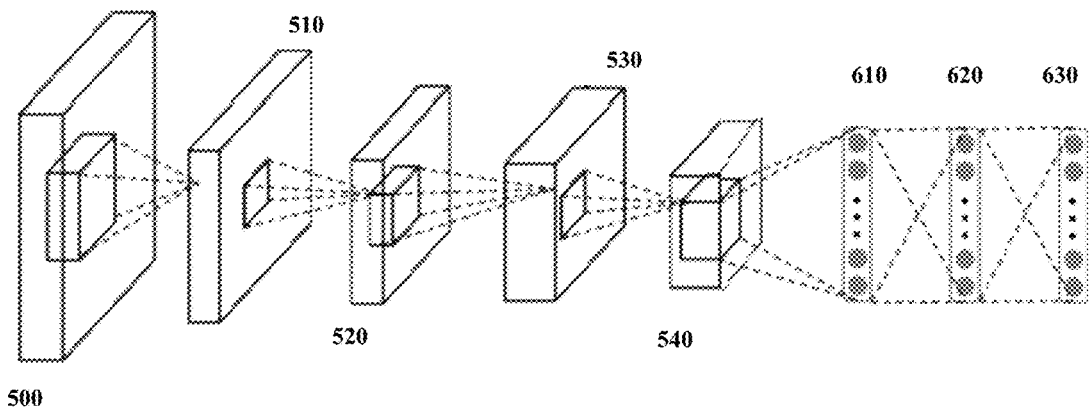
FIGS. 14A and 14B are diagrams illustrating a system architecture for Convolutional Neural Networks (CNN) according to the examples of FIG. 7 or 8.
Figure 14:
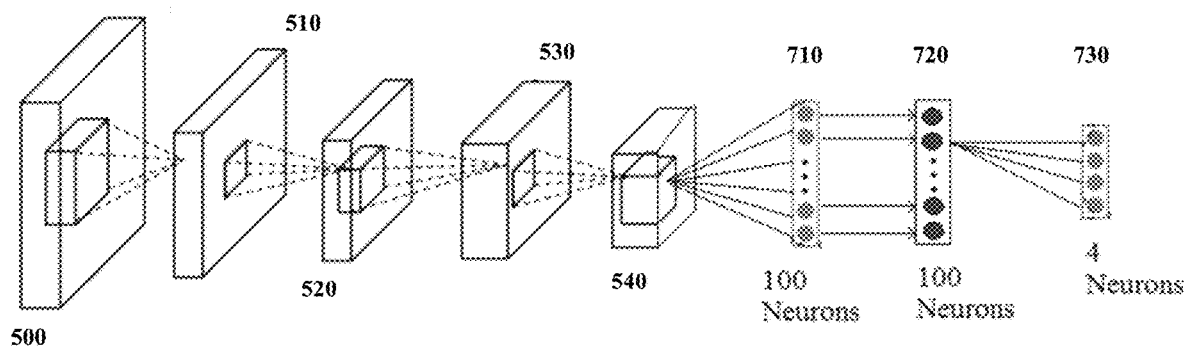

FIGS. 14A and 14B are diagrams illustrating a system architecture for Convolutional Neural Networks (CNN) according to the examples of FIG. 7 or 8.

Deep neural networks and in particular CNN have been very successful in solving computer vision problems as they rely on very basic features to obtain high level abstraction of training data. A CNN based classifier may be used for traffic light state recognition. In an example, proposed network architecture may incorporate application specific modifications in the network to reduce the number of parameters to 76000 which amounts to reduction of complexity.

Referring to FIG. 14A, a block diagram illustrates an example of a CNN of the network. In this example, an output of the detection algorithm may be resized to 48×96 pixel size before being given as an input 500 to the CNN. Initial convolution layer 510 may include 20 filters of size 5×5. Filter stride across the input image during each iteration may be 2 pixels. After the convolution layer, a max pool layer 520 with a pixel stride of 2 is used. The max pool layer 520 is followed by a second convolution layer 530 with 50 filters of 5×5 with a stride length of 2 pixels. The output convolution layer 530 may be followed by second pooling layer 540. After the second pooling layer 540, two consecutive fully connected layers 610, 620 map the network to three neurons which correspond to three classes of traffic lights, and followed by an output layer 630. Parameter reduction may primarily be achieved by reducing a number of filters and increasing the stride length to two. Since traffic lights include a limited number of shape related features, accuracy is not affected by such modifications.

Referring to FIG. 14B, a block diagram illustrates another example of a CNN of the network.

In this example, a convolution layer 510 includes 20 filters which extract basic edges as features, and the size of each convolutional filter is 5×5×3, coefficients of which are learnt by training the whole network on ground truth. Input 500 to the layer 510 may be a contour of size 48×96×3 with three color channels and convolution may be performed with a displacement of 2 pixels for each operation. Hence the output of the layer is a size 24×48×20 matrix.

A pool layer 520 may include neurons which correspond to a pool function. The pool function gives out max output out of given window of size N×N. In this example, scenario window of size 2×2 is used with a stride 2 hence the output of the pool layer 520 will be of size 6×12×20 matrix. Another convolutional layer 530 may be applied on the pool layer 520 output, the number of filters in this layer may be 2 with a kernel size of 5×5 and stride of two hence the output of the convolutional layer 530 may be a 3×6×50 matrix.

After this convolution layer 530 another pool layer 540 may be applied with kernel size of 2×2 and a stride of 2 hence the output of the pool layer 540 may be 1×3×50. Since sufficient dimensionality reduction has been achieved, all the extracted features may be interconnected to an output inner product layer 710 of 100 neurons using multiplication of weight with all possible connections between neurons in two layers, hence the output of the layer is of size 1×100.

Output inner product layer 710 may be passed through a rectified linear function neuron layer 720 with one to one correspondence hence the output size is retained as 1×100. The output of the rectified linear unit layer 720 may again be connected to 2 to 4 outputs of another inner product layer 730 which correspond to three traffic light states and one ambiguous state which implies uncertainty regarding the state of the traffic light. All the weights of the convolution and other layers may be determined by continuous training with respect to ground truth. The total number of parameters that are to be learnt may be around 75000 and the network may be capable of processing about 1000 contours per second.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the diagrams and figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

LIST OF REFERENCE NUMERALS 1, 2, 3 Motor vehicle
4 Display device, smartphone
10 Surface, windshield
12a, 12b, 12c Signaling devices, traffic lights
14 Camera
18 Touchscreen
20 Hand
22 Loudspeaker
24 Input device, keyboard
26 Output device, projector
28 Radio connection
30 Bracket
100 System for traffic light detection
105 Input image step
110 Color segmentation step
120 Filtering operation step
130 MSER step
140 HOG step
145 SVM step
150 CNN step
200 System for traffic light detection
205 Saliency map step
300 Regions of interest
310 Road
400 Detection window
410 Gradient map
420 HOG feature extraction
430 Final HOG feature vector
500 Input layer
510 First convolution layer
520 First pooling layer
530 Second convolution layer
540 Second pooling layer
610 First fully connected layer
620 Second fully connected layer
630 Output layer
710 First fully connected layer
720 Rectified linear unit layer
730 Second fully connected layer

What is claimed is:

1. A method for detecting a signaling state of at least one signaling device comprising a traffic light, the method comprising:
    obtaining at least one image which comprises an image of the at least one signaling device;
    extracting a region of the at least one image which comprises the image of the at least one signaling device;
    detecting the at least one signaling device within the extracted region of the at least one image; and
    detecting the signaling state of the at least one signaling device after detecting the at least one signaling device within the extracted region,
    wherein the extracting of the region is performed using at least one of color segmentation, a filtering operation, and a Maximally Stable Extremal Regions (MSER) operation,
    wherein the MSER operation comprises localizing a structure of the traffic light and adjusting a bounding box size, and
    wherein the MSER operation comprises selecting two seed points, one of the two seed points being selected based on an output of the color segmentation so that if the output is red, the bounding box is fixed so that a traffic light blob occupies an upper region of the bounding box, if the output is green, the bounding box is fixed so that the traffic light blob occupies a lower region of the bounding box, and if the output is amber or yellow, the bounding box is fixed so that the traffic light blob occupies a middle region of the bounding box.

2. The method of claim 1, further comprising generating a saliency map prior to extracting the region of the at least one image which comprises the image of the at least one signaling device, and limiting an area of region extraction based on the generated saliency map.

3. The method of claim 1, wherein the obtaining of the at least one image is performed using an image input device.

4. The method of claim 1, wherein the color segmentation is performed using the Hue, Saturation, Value (HSV) color space.

5. The method of claim 1, wherein the filtering operation comprises at least one of filtering by determining a width/height aspect ratio, an area, a texture, a size, and a shape of a detected candidate region.

6. The method of claim 5, wherein the filtering operation comprises determining the width/height aspect ratio of a blob of the detected candidate region and filtering out the blob where the width/height aspect ratio is substantially greater than or substantially less than one.

7. The method of claim 1, wherein the detecting of the at least one signaling device within the extracted region comprises extracting histograms of oriented gradients (HOG) features and generating an HOG feature vector.

8. The method of claim 7, wherein the detecting of the at least one signaling device within the extracted region further comprises feeding the HOG feature vector to a non-linear Support Vector Machine (SVM).

9. A vehicle configured to detect a signaling state of at least one signaling device comprising a traffic light, the vehicle comprising:
    a processor which is configured to execute steps comprising
        obtaining at least one image which comprises an image of the at least one signaling device;
        extracting a region of the at least one image which comprises the image of the at least one signaling device;
        detecting the at least one signaling device within the extracted region of the at least one image; and
        detecting the signaling state of the at least one signaling device after detecting the at least one signaling device within the extracted region,
        wherein the extracting of the reason is performed using at least one of color segmentation, a filtering operation, and a Maximally Stable Extremal Regions (MSER) operation,
        wherein the MSER operation comprises localizing a structure of the traffic light and adjusting a bounding box size, and
        wherein the MSER operation comprises selecting two seed points, one of the two seed points being selected based on an output of the color segmentation so that if the output is red, the bounding box is fixed so that a traffic light blob occupies an upper region of the bounding box, if the output is green, the bounding box is fixed so that the traffic sight blob occupies a lower region of the bounding box and if the output is amber or yellow, tire bounding box is fixed so that the traffic light blob occupies a middle region of the bounding box.

10. The vehicle of claim 9, further comprising an image input device, wherein the obtaining of the at least one image is performed using the image input device.

11. The vehicle of claim 9, wherein the processor is further configured to execute a step comprising generating a saliency map prior to extracting the region of the at least one image which comprises the image of the at least one signaling device, and limiting an area of region extraction based on the generated saliency map.

12. A non-transitory computer readable medium comprising program instructions for detecting a signaling state of at least one signaling device, the program instructions when executed causing a computer processor to execute steps comprising:
    obtaining at least one image which comprises an image of the at least one signaling device;
    extracting a region of the at least one image which comprises the image of the at least one signaling device;
    detecting the at least one signaling device within the extracted region of the at least one image; and
    detecting the signaling state of the at least one signaling device after detecting the at least one signaling device within the extracted region,
    wherein the extracting of the region is performed using at least one of color segmentation, a filtering operation, and a Maximally Stable Extremal Regions (MSER) operation,
    wherein the MSER operation comprises localizing a structure of the traffic light and adjusting a bounding box size, and
    wherein are MSER operation comprises selecting two seed points, one of are two seed points being selected based on an output of the color segmentation so drat if the output is red, the bounding box is fixed so that a traffic light blob occupies an upper region of the bounding box, if the output is green, the bounding box is fixed so that the traffic light blob occupies a lower region of the bounding box, and if the output is anther or yellow, the bounding box is fixed so that the traffic light blob occupies a middle region of the bounding box.

13. A method for detecting a signaling state of at least one signaling device comprising a traffic light, the method comprising:
    obtaining at least one image which comprises an image of the at least one signaling device;
    extracting a region of the at least one image which comprises the image of the at least one signaling device;
    detecting the at least one signaling device within the extracted region of the at least one image; and
    detecting the signaling state of the at least one signaling device after detecting the at least one signaling device within the extracted region,
    wherein the detecting of the signaling state is performed using a Convolutional Neural Network (CNN),
    wherein the CNN comprises an input layer, a first convolution layer, a first pooling layer, a second convolution layer, and a second pooling layer,
    wherein the CNN further comprises an output inner product layer, a rectified linear function neuron layer, and an output layer mapping to four neurons which correspond to three traffic light states and an ambiguous state.

14. The method of claim 13, further comprising generating a saliency map prior to extracting the region of the at least one image which comprises the image of the at least one signaling device, and limiting an area of region extraction based on the generated saliency map.

15. The method of claim 13, wherein the detecting of the at least one signaling device within the extracted region comprises extracting histograms of oriented gradients (HOG) features and generating an HOG feature vector.

16. The method of claim 15, wherein the detecting of the at least one signaling device within the extracted region further comprises feeding the HOG feature vector to a non-linear Support Vector Machine (SVM).

17. A vehicle configured to detect a signaling state of at least one signaling device comprising a traffic light, the vehicle comprising:
    a processor which is configured to execute steps comprising
        obtaining at least one image which comprises an image of the at least one signaling device;
        extracting a region of the at least one image which comprises the image of the at least one signaling device;
        detecting the at least one signaling device within the extracted region of the at least one image; and
        detecting the signaling state of the at least one signaling device after detecting the at least one signaling device within the extracted region,
        wherein the detecting of the signaling state is performed using a Convolutional Neural Network (CNN),
        wherein the CNN comprises an input layer, a first convolution layer, a first pooling layer, a second convolution layer, and a second pooling layer,
        wherein the CNN further comprises an output inner product layer, a rectified linear function neuron layer, and an output layer mapping to four neurons which correspond to three traffic light states and an ambiguous state.

18. The vehicle of claim 17, further comprising an image input device, wherein the obtaining of the at least one image is performed using the image input device.

19. The vehicle of claim 17, wherein the processor is further configured to execute a step comprising generating a saliency map prior to extracting the region of the at least one image which comprises the image of the at least one signaling device, and limiting an area of region extraction based on the generated saliency map.

20. A non-transitory computer readable medium comprising program instructions for detecting a signaling state of at least one signaling device, the program instructions when executed causing a computer processor to execute steps comprising:

obtaining at least one image which comprises an image of the at least one signaling device;

extracting a region of the at least one image which comprises the image of the at least one signaling device;

detecting the at least one signaling device within the extracted region of the at least one image; and detecting the signaling state of the at least one signaling device after detecting the at least one signaling device within the extracted region, wherein the detecting of the signaling state is performed using a Convolutional Neural Network (CNN), wherein the CNN comprises an input layer, a first convolution layer, a first pooling layer, a second convolution layer, and a second pooling layer, wherein the CNN further comprises an output inner product layer, a rectified linear function neuron layer, and an output layer mapping to four neurons which correspond to three traffic light states and an ambiguous state.

* * * * *